United States Patent [19]

Carpenter

[11] 4,454,629
[45] Jun. 19, 1984

[54] APPARATUS FOR REMOVING AN ANIMAL FROM A SHELL

[76] Inventor: Arthur C. Carpenter, c/o V. F. Kiessling, 163 Collins St., Melbourne, Victoria 3000, Australia

[21] Appl. No.: 438,976

[22] Filed: Nov. 3, 1982

[30] Foreign Application Priority Data

Nov. 10, 1981 [AU] Australia ............... PF 1491

[51] Int. Cl.³ ............................. A22C 29/00
[52] U.S. Cl. ......................... 17/51; 17/53; 17/73
[58] Field of Search .......... 17/45, 51, 53, 71, 73, 17/74, 11

[56] References Cited

U.S. PATENT DOCUMENTS 2,795,817  6/1957  Dahlberg ...................... 17/11
3,451,097  6/1969  Knight ......................... 17/11
3,964,130  6/1976  Bertrand ....................... 17/45

FOREIGN PATENT DOCUMENTS 916527   1/1963  United Kingdom .
1542403  3/1979  United Kingdom .

Primary Examiner—Willie G. Abercrombie
Attorney, Agent, or Firm—Murray, Whisenhunt & Ferguson

[57]  ABSTRACT

The invention provides an apparatus for removing an animal from a shell. The apparatus has a tubular helical main portion having an inlet, an outlet and an attachment portion for coupling the apparatus to a source of high pressure fluid. The apparatus may be inserted into the shell and coupled to high pressure fluid which urges the animal from the shell.

8 Claims, 1 Drawing Figure

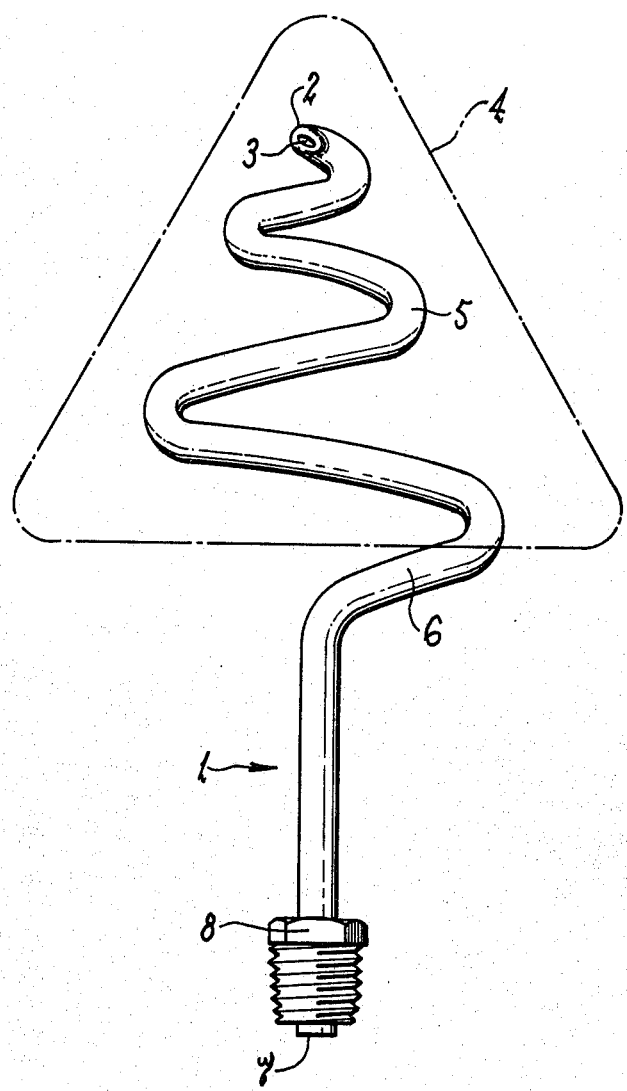

APPARATUS FOR REMOVING AN ANIMAL FROM A SHELL

This invention relates to an apparatus for removing an animal from a shell.

Whilst the apparatus of the invention may be usefully employed with a variety of shells it is particularly suitable for removing the animal from a *trochus niloticus* shell (commonly called a "trocas" shell). The invention will be described in relation to its use for removing an animal from a trocas shell. It should be appreciated that this is by way of example only and that the apparatus of the invention may also be used for removing animals from other types of shells.

Not many gastropods are of economic interest. Recently the demand by button manufacturers for Mother of Pearl has greatly increased, and as former resources become exhausted, fresh material has been eagerly sought. Recently trocas shells have been used as a source of Mother of Pearl. A trocas shell is a top shaped shell, about 3 inches high, coloured with broad stripes of alternate red and white, beneath which is solid Mother of Pearl. Trocas shells were formerly abundant on the coral reefs of Northern Australia, but through vigorous collecting has become comparatively scarce. The shells are usually gathered by hand, cleaned of the fish by boiling the shell or by allowing the animal to rot and then bagged for the market. Boiling of the shell enables the animal to be removed and consumed. However, boiling of the shell tends to lessen the quality of the finish of the shell. Also, the animal within the shell is considered to be a delicacy. When the shell is boiled the animal may be removed. However, it is difficult to obtain an export licence for cooked meat. Presently, the shell with the animal still inside is frozen and shipped to the market place. The animal may then be removed by the purchaser by either boiling the shell whole which tends to destroy the quality of the shell, or by breaking the shell and removing the animal. The latter completely destroys the shell.

It is an object of the present invention to provide an apparatus for and method of removing an animal from a shell whilst maintaining the shell intact.

According to one aspect of the invention there is provided an apparatus for removing an animal from a shell, said apparatus comprising a tubular substantially helical main portion having an inlet for ingress of fluid into the interior of said main portion and an outlet adjacent one end of said portion for egress of fluid from the interior of said main portion and an attachment portion for coupling the apparatus to a source of high pressure fluid.

According to another aspect of the invention there is provided a method of removing an animal from a shell using the apparatus of the invention comprising:

inserting said one end of the apparatus into the shell, causing relative rotary motion between the shell and the apparatus to position said one end interiorly of the shell and adjacent the apex thereof and injecting high pressure fluid into said apparatus whereby the fluid may escape from said outlet and may urge the animal out from the shell.

A preferred form of apparatus is shown in the accompanying drawings:

The apparatus 1 of the present invention has a tubular main portion 5. The main portion conforms substantially to the shape of a helix. To enable the main portion to be inserted into a trocas shell 4—shown schematically in phantom—it is preferred that the helical convolutions of the main portion decrease in diameter towards a terminal end 2. Whilst the main portion may have any suitable number of convolutions comprising the helix it is preferred that a number of convolutions enable the main portion to extend, once it is inserted into a trocas shell, from the mouth of the shell to approximately the apex of the shell. In a particular preferred form, an apparatus according to the invention suitable for a trocas shell about 100 millimeters high, has about 2½ convolutions which extend along a distance which substantially corresponds to the height of the shell. The diameter of the convolutions may correspond substantially to the diameter of that portion of the shell adjacent which the convolution would appear in use. In a particular preferred form the largest convolution has a diameter of about 60 millimeters.

The apparatus is provided with an outlet for fluid. Conveniently, the outlet is adjacent or at the terminal end 2 of the apparatus.

The outlet may be provided by one or more openings adjacent the terminal end. Preferably one outlet 3 is present at the terminal end 2 and is provided as a consequence of the apparatus being tubular. That is, the end of the tubular main portion is open.

The terminal end 2 may be provided with or adapted to form a cutting edge. The cutting edge may be provided as a separate item attachable to the terminal end of the apparatus. Alternatively the cutting edge may be formed integral with the terminal end of the main portion to provide an integral cutting edge. The terminal end of the main portion may be sharpened or otherwise reduced to a fine edge. The cutting edge ensures that it is relatively easy to insert the apparatus into the trocas shell either through the animal or between the shell and the animal.

The apparatus of the invention may also include a trailing end portion 6. The trailing end portion 6 is present to enable the apparatus to be more readily handled. The trailing end portion acts as an extension to the main portion 5 of the apparatus. The trailing end portion 6 preferably extends in a longitudinal direction along the apparatus. The trailing end portion 6 may extend substantially at right angles to the convolutions of the helical main portion. Whilst the trailing end portion may be of any suitable length it is preferred that it be about 50 millimeters in length.

The apparatus of the invention is also provided with an attachment portion 8. Where the apparatus has a trailing end portion 6 the attachment portion 8 may form an extension to the distal end of the trailing end portion. Where no trailing end portion is present the attachment portion may form an extension to the end of the main portion 5 remote from the terminal end of the apparatus. The attachment portion is suitable for coupling the apparatus to a supply of high pressure fluid. The attachment portion may be of any suitable type. For example, the attachment portion may be a frictional fit with a co-operating fitting at a supply of high pressure fluid. Alternatively the attachment portion may be a bayonet fitting. It is preferred however that the attachment portion be a screw coupling adapted for attachment to a complementary fitting provided at a supply of high pressure fluid.

The apparatus of the invention is provided with an inlet 7 for fluid. It is preferred that this inlet be adjacent the trailing end portion of the apparatus. It will be seen that the inlet enables fluid from the source of fluid to communicate with the interior of the apparatus and escape out through the outlet at the terminal end of apparatus.

The apparatus of the invention, as will be evident from the above, is tubular along its length. The apparatus may be made of any suitable material. It is preferred that all portions of the apparatus are made from the same material although this is not essential. In a particularly preferred form of the apparatus all of the portions are made as integral items to comprise an apparatus made up of portions which do not need to be coupled or otherwise joined together. It is preferred that the apparatus of the invention be made of metal. The apparatus may be made from tubular material having an internal lumen of any suitable diameter. It is preferred that the tubular material be capable of withstanding high pressure. It is preferred that the internal lumen be about 1 millimeter in diameter. The external diameter of the tubular material may be about 8 millimeters. The method of the invention comprises inserting the apparatus into the mouth of a shell and rotating the apparatus and/or the shell until the terminal end is placed adjacent the apex of the shell. Once the terminal end is adjacent the apex of the shell a source of high fluid pressure is supplied to the attachment portion of the apparatus. The fluid under pressure is forced through the tubular apparatus and into the shell at the apex thereof. The high pressure fluid when introduced in this manner into the shell tends to urge the animal out of the shell. It has been found that any suitable pressure may be used to urge the animal out of the shell. The fluid employed may be at a pressure within the range of 1000 to 5000 pounds per square inch. A particularly preferred range of pressure for the fluid is 1000 to 2500 pounds per square inch whilst any suitable fluid may be used to urge the animal out of the shell it is preferred that the fluid employed be water. Where the apparatus of the invention is used on a boat for example sea water may be employed as the fluid.

It should be appreciated that many changes, modifications, alterations or additions may be made to the apparatus described above without departing from the spirit or ambit of the invention defined in the appended claims.

For example, whilst the apparatus may be made of steel it could also be made of suitable synthethic materials or stainless steel. Also, the apparatus may itself form an extension to a handle or other means to facilitate ease of use of the apparatus of the invention. Where a handle is employed the distal end thereof may be coupled to a supply of fluid and the handle be hollow or fluid may be introduced to the apparatus in any convenient way.

The claims defining the invention are as follows:

1. An apparatus for removing an animal from a shell, said apparatus comprising a tubular substantially helical main portion having an inlet for ingress of fluid into the interior of said main portion and an outlet adjacent one end of said main portion for egress of fluid from the interior of said main portion and an attachment portion for coupling the apparatus to a source of high pressure fluid.

2. An apparatus as claimed in claim 1 wherein said one end of said main portion is provided with a cutting edge.

3. An apparatus as claimed in claim 1 wherein the helical convolutions of said main portion decrease progressively in diameter towards the one end thereof.

4. An apparatus as claimed in claim 1 wherein said main portion has about 2½ convolutions.

5. An apparatus as claimed in claim 1 wherein said outlet is provided by one or more openings.

6. An apparatus as claimed in claim 1 including a trailing end portion between said main portion and said attachment means, said trailing end portion acting as an extension to said main portion.

7. A method of removing an animal from a shell comprising: inserting one end of a helical, tubular tool having a fluid inlet and a fluid outlet into the shell, causing relative rotary motion between the shell and the apparatus to position said one end interiorly of the shell and adjacent the apex thereof and injecting high pressure fluid into said apparatus whereby the fluid may escape from said outlet and may urge the animal out from the shell.

8. A method according to claim 7 wherein said fluid is at a pressure within the range of 1000 to 5000 pounds per square inch.

* * * * *